(12) United States Patent
Duesterwald et al.

(10) Patent No.: US 12,198,073 B2
(45) Date of Patent: Jan. 14, 2025

(54) HYBRID DECISION MAKING AUTOMATION

(71) Applicant: International Business Machines Corporation, Armonk, NY (US)

(72) Inventors: Evelyn Duesterwald, Millwood, NY (US); Michael Desmond, White Plains, NY (US); Kristina Marie Brimijoin, Hastings on Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 1022 days.

(21) Appl. No.: 17/113,467

(22) Filed: Dec. 7, 2020

(65) Prior Publication Data

US 2022/0180230 A1 Jun. 9, 2022

(51) Int. Cl.
  *G06N 5/043* (2023.01)
  *G06N 3/08* (2023.01)
  *G06N 20/00* (2019.01)

(52) U.S. Cl.
  CPC .............. *G06N 5/043* (2013.01); *G06N 3/08* (2013.01); *G06N 20/00* (2019.01)

(58) Field of Classification Search
  CPC ........... G06N 5/043; G06N 20/00; G06N 3/08
  See application file for complete search history.

(56) References Cited

U.S. PATENT DOCUMENTS

| 8,019,707 B2 | 9/2011 | Shani et al. |
| 2019/0065939 A1 | 2/2019 | Bourgoin et al. |
| 2020/0184270 A1 | 6/2020 | Omer et al. |
| 2020/0327374 A1 | 10/2020 | Tsai et al. |
| 2021/0279547 A1* | 9/2021 | Lee ................. G06N 20/00 |

FOREIGN PATENT DOCUMENTS

| CN | 104735163 B | 12/2018 |
| CN | 110516114 A | 11/2019 |
| CN | 107391687 B | 4/2020 |

(Continued)

OTHER PUBLICATIONS

Yu et al. "Do I Trust My Machine Teammate? An Investigation from Perception to Decision", Mar. 2019, pp. 9, https://opus.lib.uts.edu.au/bitstream/10453/131877/4/IUI_Kun.pdf.*

(Continued)

*Primary Examiner* — Li Wu Chang
(74) *Attorney, Agent, or Firm* — Michael O'Keefe

(57) ABSTRACT

Techniques are provided for decision making tasks using a hybrid approach where cooperation between an AI assessor and a human labeler controls automation of the process. In one aspect, a method for hybrid decision making automation includes: monitoring interactions between an AI assistant and a human decision maker; tracking, from the interactions, agreement of the human decision maker with decision predictions made by the AI assistant; determining a predicted performance of data tasks by the AI assistant on unseen data based on the agreement of the human decision maker with the decision predictions over time; and assessing delegation of remaining data tasks on the unseen data to the AI assistant using the predicted performance.

25 Claims, 10 Drawing Sheets

(56) References Cited

FOREIGN PATENT DOCUMENTS

TW 201939363 A 10/2019
WO WO2020185101 A1 9/2020

OTHER PUBLICATIONS

Honeycutt et al. "Soliciting Human-in-the-Loop User Feedback for Interactive Machine Learning Reduces User Trust and Impressions of Model Accuracy", Aug. 2020, pp. 10, https://doi.org/10.48550/arXiv.2008.12735.*

Burr Settles, "Active Learning Literature Survey," Computer Science Technical Report 1648, University of Wisconsin-Madison (Jan. 2009) (46 pages).

Oriol Vinyals et al., "Matching Networks for One Shot Learning," arXiv:1606.04080v2 (Dec. 2017) (12 pages).

Eric Arazo et al., "Pseudo-Labeling and Confirmation Bias in Deep Semi-Supervised Learning," arXiv:1908.02983v5 (Jun. 2020) (8 pages).

Alexander Ratner et al., "Snorkel: Rapid Training Data Creation with Weak Supervision," arXiv:1711.10160v1 (Nov. 2017) (17 pages).

Yunfeng Zhang et al., "Effect of Confidence and Explanation on Accuracy and Trust Calibration in AI Assisted Decision Making," arXiv:2001.02114v1 (Jan. 2020) (11 pages).

Vivian Lai et al., "On Human Predictions with Explanations and Predictions of Machine Learning Models: A Case Study on Deception Detection," arXiv:1811.07901v4 (Jan. 2019) (11 pages).

Silvio B. Guerra et al., "Predicting the Performance of Learning Algorithms Using Support Vector Machines as Meta-Regressors," International Conference on Artificial Neural Networks—ICANN 2008 (10 pages).

Chelsea Finn et al., "Online Meta-Learning," arXiv:1902.08438v4 Jul. 2019 (19 pages).

Yue Zhang et al., "A Generic Human-Machine Annotation Framework Based on Dynamic Cooperative Learning," IEEE Transactions on Cybernetics, vol. 50, Issue 3 (Mar. 2020) (10 pages).

Zhou et al., "Learning with Local and Global Consistency," Proceedings of the 16th International Conference on Neural Information Processing Systems, Dec. 2003 (8 pages).

Maria-Florina Balcan et al., "Margin Based Active Learning," Bshouty N.H., Gentile C. (eds) Learning Theory. International Conference on Computational Learning Theory COLT 2007, Lecture Notes in Computer Science, vol. 4539, Springer, Berlin, Heidelberg (16 pages).

Mell et al., "The NIST Definition of Cloud Computing," NIST Special Publication 800-145, Sep. 2011 (7 pages).

* cited by examiner

HYBRID DECISION MAKING AUTOMATION

FIELD OF THE INVENTION

The present invention relates to machine learning, and more particularly, to machine learning-based techniques for decision making tasks such as data labeling using a hybrid approach where cooperation between an artificial intelligence (AI) assessor and a human labeler controls automation of the process.

BACKGROUND OF THE INVENTION

Training a machine learning process for performing decision making tasks, such as data labeling, requires large amounts of labeled data. For instance, training a machine learning process to label images can require hundreds of thousands of labeled images to use as training data. Therefore, manually labeling the data using human labelers, is extremely time consuming and thus expensive. See, for example, Zhou et al., "Learning with Local and Global Consistency," Proceedings of the 16th International Conference on Neural Information Processing Systems, December 2003 (8 pages) (hereinafter "Zhou").

As such, alternative approaches to manual labeling have been explored. For instance, with artificial intelligence (AI)-assisted data labeling approaches, AI tooling is used to help the human labeler with everything from label look-up to making labeling suggestions. While AI-assisted data labeling enhances the productivity of the human labeler and speeds up the process, items still have to be evaluated individually. Thus, AI-assisted data labeling has scaling limitations.

Automated AI approaches automatically label the data based on a small amount of human input. Namely, a small subset of labeled data is used to derive the labels for the remaining data automatically. Some common automated data labeling approaches include weak supervision and semi-supervised learning. With weak supervision, noisy, limited, or imprecise sources are used as a supervision signal for labeling a large amount of training data. Semi-supervised learning combines a small amount of labeled data with a large amount of unlabeled data during training. While efficient and scalable, these automated approaches however require the human labeler to relinquish control of the process. Thus, there is no guarantee for the quality and accuracy of the labeled data that is produced.

Accordingly, machine learning-based techniques for performing decision making tasks such as data labeling that achieve the efficiency level of the automated approaches, but maintain level of human supervision and control as in the assisted approaches would be desirable.

SUMMARY OF THE INVENTION

The present invention provides machine learning-based techniques for decision making tasks such as data labeling using a hybrid approach where cooperation between an artificial intelligence (AI) assessor and a human labeler controls automation of the process. In one aspect of the invention, a method for hybrid decision making automation is provided. The method includes: monitoring interactions between an AI assistant and a human decision maker; tracking, from the interactions, agreement of the human decision maker with decision predictions made by the AI assistant; determining a predicted performance of data tasks (e.g., data labeling tasks) by the AI assistant on unseen data based on the agreement of the human decision maker with the decision predictions over time; and assessing delegation of remaining data tasks on the unseen data to the AI assistant using the predicted performance.

Accordingly, a delegation assessment can be presented to the human decision maker. A delegation decision can be obtained from the human decision maker, and performance of the remaining data tasks on the unseen data can be delegated to the AI assistant. Advantageously, the present techniques leverage the benefits of automated decision making such as scalability, while at the same time retain control by the human decision maker until a level of confidence in the predictions of the AI assistant has been achieved to ensure a quality and accuracy of the predictions.

Namely, the predicted performance of the data tasks can be determined using an agreement predictor model which is trained using the agreement of the human decision maker with the decision predictions over time. Once trained, the agreement predictor model can be applied to remaining unseen data to determine a predicted agreement accuracy of the AI assistant for the remaining unseen data, and an automation readiness of the AI assistant can be assessed using the predicted agreement accuracy.

In another aspect of the invention, another method for hybrid decision making automation is provided. The method includes: monitoring interactions between an AI assistant and a human decision maker; tracking, from the interactions, agreement of the human decision maker with decision predictions made by the AI assistant; determining a predicted performance of data tasks by the AI assistant on unseen data based on the agreement of the human decision maker with the decision predictions over time; assessing delegation of remaining data tasks on the unseen data to the AI assistant using the predicted performance; determining whether a pre-configured threshold in predicted AI-human agreement has been reached; and delegating performance of the remaining data tasks on the unseen data to the AI assistant when the pre-configured threshold in predicted AI-human agreement has been reached.

The above can be performed by an AI assessor. The AI assessor can operate in the background, i.e., in a silent mode, such that the human decision maker is unaware of the AI assessor's activity related to the labeling process, including delegation decisions. Doing so advantageously provides further automation assistance to the human decision maker.

In yet another aspect of the invention, yet another method for hybrid decision making automation is provided. The method includes: making decision predictions on data tasks (e.g., data labeling tasks) using an AI assistant based on decisions the AI assistant has already received from a human decision maker; presenting the decision predictions to the human decision maker for the human decision maker to agree or disagree with the decision predictions, wherein an AI assessor, which monitors interactions between the AI assistant and the human decision maker, tracks agreement of the human decision maker with the decision predictions made by the AI assistant from the interactions, determines a predicted performance of the data tasks by the AI assistant on unseen data based on the agreement of the human decision maker with the decision predictions over time, and assesses delegation of remaining data tasks on the unseen data to the AI assistant using the predicted performance; and performing the remaining data tasks on the unseen data when performance has been delegated to the AI assistant.

The decision predictions can be presented to the human decision maker along with a corresponding data item and a confidence value. Thus, as provided above, the human decision maker advantageously retains control of the process until a level of confidence in the predictions of the AI assistant has been achieved to ensure a quality and accuracy of the predictions.

A more complete understanding of the present invention, as well as further features and advantages of the present invention, will be obtained by reference to the following detailed description and drawings.

DETAILED DESCRIPTION OF PREFERRED EMBODIMENTS

Figure 1:
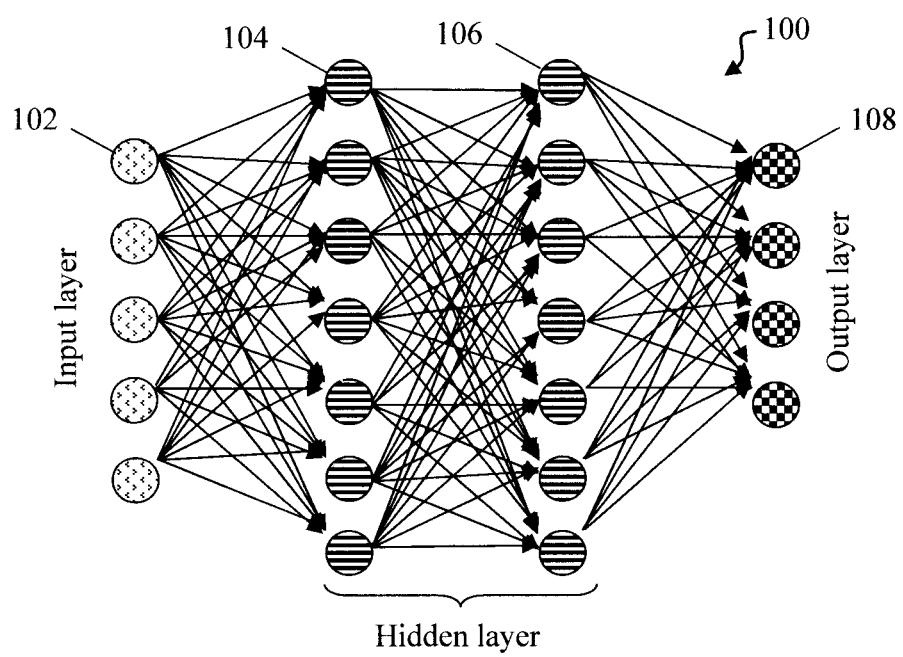
FIG. 1 is a schematic diagram illustrating an exemplary deep neural network according to an embodiment of the present invention.

Provided herein are machine learning-based techniques for decision making tasks using cooperation between an artificial intelligence (AI) assessor and a human labeler to control the level of automation of the process. The present techniques may be thought of as a hybrid approach between assisted and automated machine learning approaches (see above), leveraging the benefits of each approach. Thus, advantageously, by way of this hybrid approach, enhanced efficiency can be achieved without fully relinquishing control of the process. Thus, a greater quality and accuracy of the task performance can be guaranteed.

It is notable that the present techniques are generally applicable to any machine learning-assisted decision making process where data tasks are provided, and decisions are needed for the data tasks. For instance, as will be described in detail below, the present techniques can be employed for data labeling, where the tasks involve providing labels for data (such as image data). Other non-limiting applications include machine learning-assisted decision making in the field of medical diagnosis, where the tasks involve making diagnostic decisions based on image data such as x-ray image data to determine if a patient has certain factors related to a disease or other medical condition. Based on that information, physicians can perform related diagnostics and tests, devise appropriate treatment options, etc.

As will be described in detail below, the present techniques employ a three-party system, including an AI assistant, a human decision maker, and an AI assessor. The AI assistant takes input data and makes decision predictions based on decisions the AI assistant has already received from the human decision maker. For instance, in the context of data labeling, the AI assistant takes unlabeled input data and makes label predictions based on labels the AI assistant has already received from the human decision maker.

This process proceeds in an active learning refinement loop, where the AI assistant selects batches of the unprocessed (e.g., unlabeled) input data and presents them to the human decision maker. The human decision maker provides (true) human decisions (e.g., labels) for the presented items to the AI assistant, to be used by the AI assistant in making future decision predictions, and so on. Once a number of decisions have been made, the human decision maker or AI assessor can eventually delegate decision making (e.g., labeling) on the remainder of the data to the AI assistant (e.g., for auto-labeling) based on the delegation decision support provided by the AI assessor.

The AI assessor provides decision support by observing this interaction between the AI assistant and the human decision maker from the outside. Namely, the AI assessor tracks the AI assistant-to-human decision maker decision agreement and then predicts how well the agreement will continue to be on unseen input data. Based on this tracking and prediction, the AI assessor can assess the readiness of the AI assistant for automated operation (automation readiness) such as auto-labeling, and recommend delegating of the remaining data to the AI assistant.

In one exemplary embodiment described below, the human decision maker ultimately makes the delegation decision. However, the human decision maker advantageously has the data and statistics from the AI assessor about the tracked and predicted AI assistant-to-human decision maker agreement to aid in making the delegation decision. In an alternative embodiment described below, the AI assessor operates in 'silent mode' meaning that the AI assessor operates in the background such that the human decision maker is unaware of the AI assessor's activity related to the labeling process. In that case, instead of presenting the results to the human decision maker, it is the AI assessor that initiates delegation of data tasks to the AI assistant based, e.g., on reaching a pre-configured threshold in predicted AI-human agreement. By way of example only, the pre-configured threshold can be determined up front by the human decision maker. For instance, the human decision maker may decide that a 95% predicted agreement is sufficient to delegate to the AI Assistant. A 95% predicted agreement means that the AI assistant makes the same decisions (e.g., selects the same labels) as the human decision maker 95% of the time. For high stakes decisions, the threshold may be higher such as 99%.

In general, the AI assistant and the AI assessor represent any type of learning algorithm including, but not limited to, a machine learning process. The AI assistant and the AI assessor can be implemented in a computer-based apparatus such as apparatus 800 described in conjunction with the description of FIG. 8, below. One illustrative, non-limiting example of a machine learning process is a deep neural network. In machine learning and cognitive science, deep neural networks are a family of statistical learning models inspired by the biological neural networks of animals, and in particular the brain. Deep neural networks may be used to estimate or approximate systems and cognitive functions that depend on a large number of inputs and weights of the connections which are generally unknown.

Deep neural networks are often embodied as so-called "neuromorphic" systems of interconnected processor elements that act as simulated "neurons" that exchange "messages" between each other in the form of electronic signals. See, for example, FIG. 1 which provides a schematic illustration of an exemplary deep neural network 100. As shown in FIG. 1, deep neural network 100 includes a plurality of interconnected processor elements 102, 104/106 and 108 that form an input layer, at least one hidden layer, and an output layer, respectively, of the deep neural network 100. By way of example only, deep neural network 100 can be embodied in an analog cross-point array of resistive devices such as resistive processing units (RPUs).

Similar to the so-called 'plasticity' of synaptic neurotransmitter connections that carry messages between biological neurons, the connections in a deep neural network that carry electronic messages between simulated neurons are provided with numeric weights that correspond to the strength or weakness of a given connection. The weights can be adjusted and tuned based on experience, making deep neural networks adaptive to inputs and capable of learning. For example, a deep neural network for image labeling is defined by a set of input neurons (see, e.g., input layer 102 in deep neural network 100) which may be activated by the pixels of an input image. After being weighted and transformed by a function determined by the network's designer, the activations of these input neurons are then passed to other downstream neurons, which are often referred to as 'hidden' neurons (see, e.g., hidden layers 104 and 106 in deep neural network 100). This process is repeated until an output neuron is activated (see, e.g., output layer 108 in deep neural network 100). The activated output neuron makes a label decision.

Instead of utilizing the traditional digital model of manipulating zeros and ones, deep neural networks such as deep neural network 100 create connections between processing elements that are substantially the functional equivalent of the core system functionality that is being estimated or approximated. For example, IBM's SyNapse computer chip is the central component of an electronic neuromorphic machine that attempts to provide similar form, function and architecture to the mammalian brain. Although the IBM SyNapse computer chip uses the same basic transistor components as conventional computer chips, its transistors are configured to mimic the behavior of neurons and their synapse connections. The IBM SyNapse computer chip processes information using a network of just over one million simulated "neurons," which communicate with one another using electrical spikes similar to the synaptic communications between biological neurons. The IBM SyNapse architecture includes a configuration of processors (i.e., simulated "neurons") that read a memory (i.e., a simulated "synapse") and perform simple operations. The communications between these processors, which are typically located in different cores, are performed by on-chip network routers.

Figure 2:
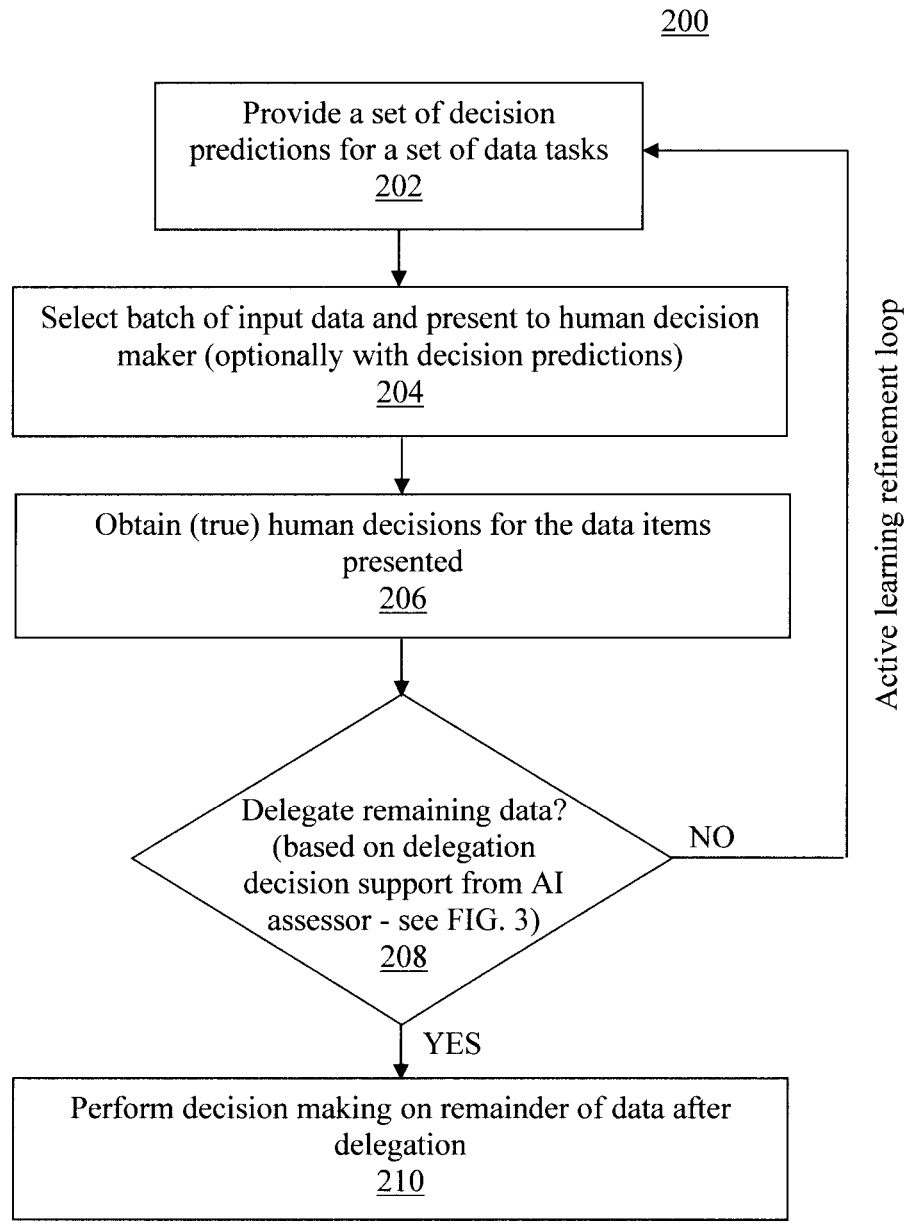
FIG. 2 is a diagram illustrating an exemplary methodology for hybrid decision making automation as performed by an AI assistant when coordinating with a human decision maker and an AI assessor according to an embodiment of the present invention.
Figure 3:
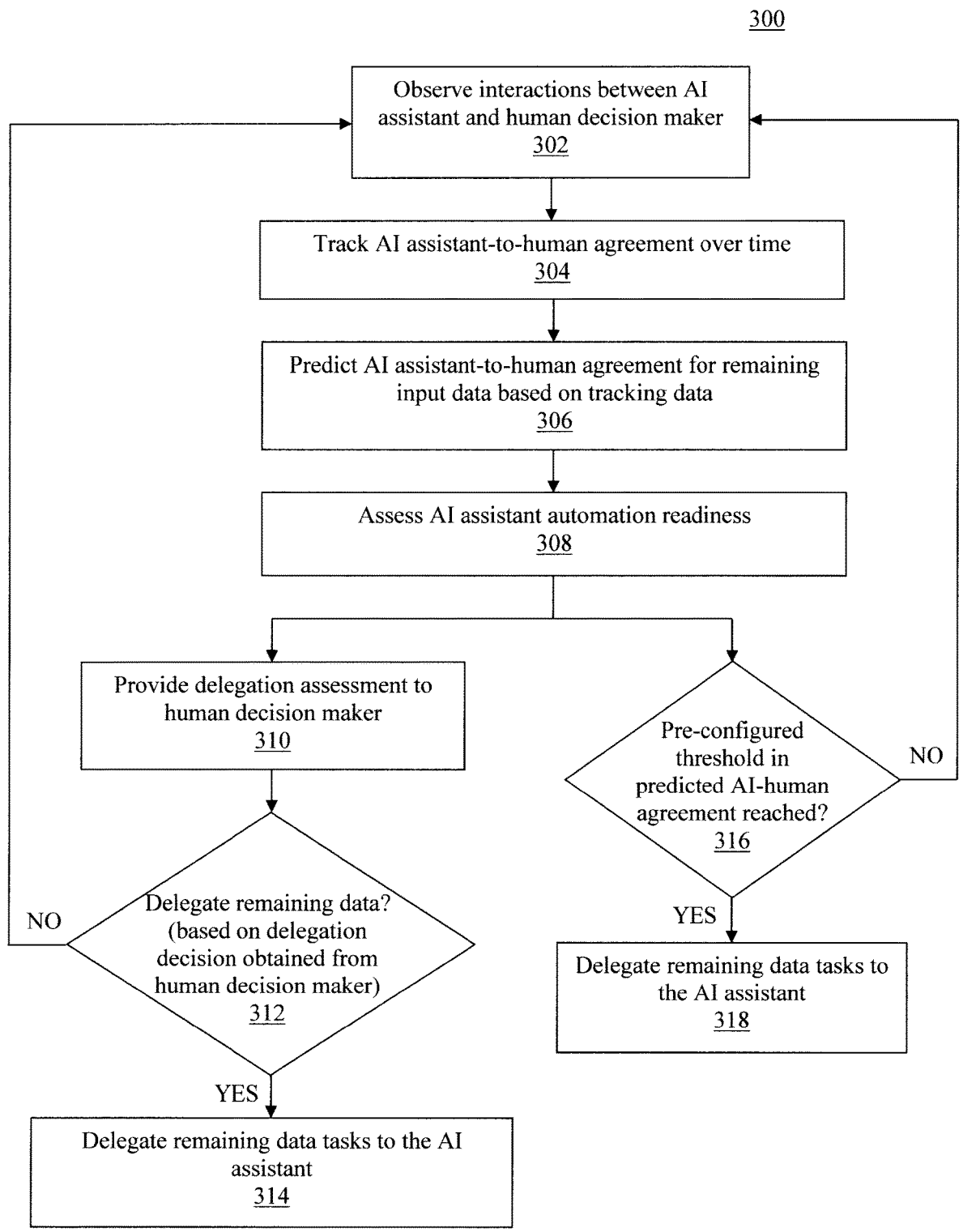
FIG. 3 is a diagram illustrating an exemplary methodology for hybrid decision making automation as performed by the AI assessor when observing interactions between the human decision maker and the AI assessor according to an embodiment of the present invention.

Given the above overview, an exemplary embodiment for hybrid decision making automation in accordance with the present techniques is now described by way of reference to FIGS. 2 and 3. As highlighted above, the present scheme employs a three-party system, including an AI assistant, a human decision maker, and an AI assessor. The AI assistant coordinates with the human decision maker to make decision predictions.

FIG. 2 provides an exemplary methodology 200 for hybrid decision making automation one or more steps of which can be performed by the AI assistant when coordinating with the human decision maker and the AI assessor. In step 202, the AI assistant takes input data and provides a set of decision predictions for a set of data tasks. When acting in this role of making decision predictions, the AI assistant may also be referred to herein generally as a 'decision predictor.' As will be described below, in one exemplary embodiment, the AI assistant (acting as a decision predictor) makes label predictions for data labeling tasks.

The decision predictions are made based on decisions the AI assistant has already received from the human decision maker such that the AI assistant and the human decision maker execute an active learning refinement loop. Namely, in step 204, the AI assistant selects a batch of the (unprocessed) input data items and presents the data items to the human decision maker. According to an exemplary embodiment, the AI assistant uses a selection strategy such as low margin active learning to select the input data to present to the human decision maker. The notion here is that the AI assistant is given the task of selecting (unprocessed) input data to incorporate in the active learning refinement loop. One process which can assist in that selection is active learning. An active learning algorithm has both the capability of drawing random unlabeled examples from the underlying distribution and that of asking for the labels of any of these examples, and the hope is that a good classifier can be learned with significantly fewer labels by actively directing the queries to informative examples. See, for example, Maria-Florina Balcan et al., "Margin Based Active Learning," Bshouty N. H., Gentile C. (eds) Learning Theory. International Conference on Computational Learning Theory COLT 2007, Lecture Notes in Computer Science, vol 4539, Springer, Berlin, Heidelberg (16 pages). In low margin (or simply margin) based active learning, the active learner chooses the most uncertain examples to maximize learning. The most uncertain examples are determined as the examples with the smallest margin between the top-2 predicted labels (or decisions).

Thus, the goal is to obtain (true) human decisions for the data from the human decision maker (see step 206, described below). In that regard, it may be beneficial to assist the human decision maker with this process in order to enhance efficiency. Therefore, optionally, in step 204 decision predictions made by the AI assistant are also provided along with the data presented to the human decision maker. Doing so will assist the human decision maker in making the correct decision.

Presenting decision predictions made by the AI assistant to the human decision maker in step 204 (along with the corresponding data item and a confidence value—see below) permits the human decision maker to review the performance of the AI assistant by either agreeing or disagreeing (agreed/not agreed) with the predictions made by the AI assistant, also referred to herein as 'AI assistant-to-human decision maker decision agreement' or simply 'AI-to-human agreement.' As will be described in conjunction with the description of FIG. 3 below, the AI assessor tracks this AI-to-human agreement over time. The agreement tracking by the AI assessor happens in the background during the active learning refinement loop. Thus, when human decisions are obtained in step 206 (described below), in the background, agreement between the human decision and prediction is measured and recorded by the AI assessor.

The decision predictions are the work of the AI assistant and the AI assessor needs to have access to them. Thus, the decision predictions always need to be shared with/visible to the AI assessor, such that the AI assessor can track agreement between the human decision and prediction in the background. However, as provided above, it is optional whether the decision predictions are also shown to the human decision maker.

In step 206, (true) human decisions for the data items presented to the human decision maker are obtained from the human decision maker. These human decisions for the data items are then used by the AI assistant in making further decision predictions, and so on. Namely, as shown in FIG. 2, the process is repeated iteratively, i.e., in an active learning refinement loop. In step 206, the human decision maker will provide human decisions for the data items that have been presented to the human decision maker. For instance, in the case of data labeling, the human decision maker will provide labels for each of the data items. For those data items presented to the human decision maker along with decision predictions made by the AI assistant (see above), the human decision maker will either agree or disagree with the decision prediction from the AI assistant and, in the latter, change the decision (e.g., label).

Any type of semi-supervised learning, self-training/auto-labeling and/or weak supervision process can be employed to train the AI assistant using the (true) human decisions. For example, the tasks with human decisions obtained so far can be used as training data to train a supervised machine learning model to make predictions for the remaining tasks (self-training/auto-labeling). According to an exemplary embodiment, a semi-supervised learning process such as label spreading is employed. 'Semi-supervised' refers to learning from data processed and unprocessed data. For instance, in the context of data labeling, semi-supervised learning is learning from labeled and unlabeled data. The key to semi-supervised problems is the prior assumption of consistency, which means: (1) nearby points are likely to have the same label, and (2) points on the same structure (typically referred to as a cluster or a manifold) are likely to have the same label. See Zhou. A semi-supervised clustering technique such as label spreading may be used to propagate the clusters whereby the label information from each point is spread to its neighbors in the cluster. Semi-supervised learning uses both the decisions obtained so far as well as the information from the remaining tasks (such as proximity and neighbor information) to propagate and obtain labels for the remaining data. In label spreading, labels are propagated to neighboring items.

In step 208, a decision is made as to whether to delegate performance of the data tasks on the remaining data to the AI assistant. As will be described in conjunction with the description of FIG. 3 below, this delegation decision is supported by an analysis from the AI assessor which has been tracking AI-to-human agreement in the background and will predict performance of the AI assistant in making future decisions. This prediction serves as a metric for how well the performance will be once the decision making has been delegated to the AI assistant. In other words, the predicted performance is an assessment of the readiness of the AI assistant for automated operation (i.e., the automation readiness) such as auto-labeling.

Namely, at some point in the process, once a level of confidence has been met in the decisions being made by the (trained) AI assistant, the decision making capabilities can be fully delegated to the AI assistant. As highlighted above and as will be described in detail below, the decision to delegate the remaining tasks can reside wholly with the human decision maker or, alternatively, the decision to delegate the remaining data tasks to the AI assistant can be made by the AI assessor (i.e., when the AI assessor operates in a silent mode). When the delegation decision will be made by the human decision maker, the AI assessor can provide a recommendation to the human decision maker when automation readiness has been achieved. Alternatively, in silent mode, the AI assessor itself can determine when automation readiness has been achieved based, for example, on a pre-configured threshold in predicted AI-human agreement. In either case, however, the delegation decision is supported by the AI assessor which tracks the interactions between the AI assistant and the human decision maker and, from those interactions, assesses the automation readiness.

Based on the presented analysis from the AI assessor (which is provided at the end of each active learning loop iteration), if it is decided in step 208 that NO automation readiness has not yet been achieved, then delegation to the AI assistant is declined and training is continued with manual decision in the next iteration of the active learning refinement loop. On the other hand, if it is decided in step 208 that YES automation readiness has been achieved, then the decision making capabilities are fully delegated to the AI assistant and in step 210 the AI assistant performs the decision making on the remainder of the data tasks without receiving verification (agreed/not agreed) from the human decision maker.

FIG. 3 provides an exemplary methodology 300 for hybrid decision making automation one or more steps of which can be performed by the AI assessor when observing the interactions between the human decision maker and the AI assistant. In step 302, the AI assessor observes the interactions between the human decision maker and the AI assistant. As provided above, the AI assistant makes decision predictions on input data based on decisions the AI assistant has already received from the human decision maker such that the AI assistant and the human decision maker execute an active learning refinement loop. The AI assessor monitors these AI assistant-human decision maker interactions in step 302.

In step 304, the AI assessor tracks the AI-to-human agreement over time. Namely, by observing the AI assistant-human decision maker interactions (see step 302), the AI assessor can determine how often the (true) human decisions from the human decision maker confirms (or does not confirm) the decision predictions from the AI assistant. To use a data labeling scenario as a non-limiting example, in step 304 the AI assessor can track how often the predicted labels from the AI assistant concur with the labels assigned by the human decision maker on the same data items from interactions between the AI assistant and the human decision maker that have occurred over time.

Tracking the AI-to-human agreement over time enables the AI assessor to assess and characterize the quality of the AI predictions. For instance, one metric employed might be how often the human decision maker agrees with the top-N prediction from the AI assistant. To use an image labeling task as an illustrative, non-limiting example, when making a decision prediction the AI assistant will determine a probability distribution vector across possible labels for the image. If the AI assistant's top label prediction for an image is 'dog,' followed by 'cat' and 'rabbit' in that order, then the top-1 (where N=1) prediction is 'dog.' For top-2 accuracy (where N=2), the label of 'cat' would be considered correct, and so on. To look at it another way, the label 'cat' would not be considered as correct for top-1 accuracy.

In step 306, based on the tracked agreement data, the AI assessor predicts the AI assistant-to-human agreement for the remaining (unseen) input data. Doing so permits an assessment to be made as to whether future predictions by the AI assistant will be made with a sufficient level of accuracy, or whether the AI assistant needs further training. That assessment will then support making the delegation decision. According to an exemplary embodiment, the predicted AI assistant-to-human agreement for the remaining (unseen) input data is made using a performance predictor model that uses the tracked agreement data to train an agreement predictor model. Through this training, the agreement predictor model will learn under what circumstances (i.e., for which data item characteristics and which AI assistant predictions and confidence value characteristics) the AI assistant is likely to receive an agreement from the human decision maker. An exemplary performance predictor model for use in accordance with the present techniques is described in conjunction with the description of FIG. 4 below.

Based on the tracking (step 304) and predicted performance (step 306), in step 308 the AI assessor makes an assessment of the readiness of the AI assistant for automated operation (automation readiness). For instance, by way of example only, the assessment made in step 308 can be based on AI-to-human agreement, namely what percentage of the time the human decision maker agreed with the decision predictions of the AI assistant, e.g., there is 80% agreement on the last 50 data items tracked. Different agreement measures may be used. For example, only the top-1 prediction may be compared to the human decision to measure agreement. Alternatively, the entire probability distribution of the decision predictions may be compared to the human decision to determine a distance value between human decision and AI assistant prediction as a probability distribution. As highlighted above, the AI assistant will provide a confidence value along with its decision prediction on each of the data items. Thus, another potential metric is certainty, for example, how certain the AI assistant is about the accuracy of the predictions it has made over time. Using the performance predictor model (see below), the AI assistant can also determine how accurate it thinks it will be should the AI assistant begin automated operation in the dataset's current state.

As highlighted above, the delegation decision can be made by the human decision maker or by the AI assessor (e.g., when the AI assessor is operating in silent mode). With the former scenario, in step 310 the AI assessor provides its assessment (from step 308) to the human decision maker. The human decision maker will then make a delegation decision based on the assessment provided by the AI assessor. For instance, using the examples provided above, if the predicted accuracy for automated operation of the AI assistant in the dataset's current state is low, then the human decision maker would at present choose not to delegate the remaining data tasks to the AI assistant. However, the accuracy (and other metrics of performance) are expected to improve over time, as the AI assistant sees more training data.

In step 312, a decision is then made by the human decision maker as to whether to delegate performance of the remaining data items to the AI assistant. This delegation decision is obtained by the AI assessor. If it is decided in step 312 that NO performance of the remaining data items should not be delegated to the AI assistant, then the AI assessor continues to observe, track and predict AI-to-human agreement until a decision is obtained from the human decision maker to delegate performance of the remaining data items to the AI assistant. On the other hand, if it is decided in step 312 that YES performance of the remaining data items should be delegated to the AI assistant, then in step 314, the AI assessor (upon obtaining this decision) delegates the remaining data tasks to the AI assistant.

Alternatively, when operating in silent mode, the AI assessor makes the decision as to whether to delegate the remaining data tasks to the AI assistant. By 'silent mode,' it is meant that the AI assessor operates in the background such that the human decision maker is unaware of the one or more functions the AI assessor performs in the decision making process. In this alternative 'silent mode' embodiment, the involvement of the human decision maker in the decision making process is the same as described above, except that the human decision maker does not control the automation delegation decision. Here, the AI assessor acts as like a second opinion for the AI assistant.

Namely, rather than presenting an assessment (based on the tracking and prediction data) to the human decision maker, in step 316 the AI assessor determines whether a pre-configured threshold in predicted AI-human agreement has been reached. As provided above, the pre-configured threshold can be determined up front by the human decision maker. For instance, by way of example only, if the predicted accuracy for automated operation of the AI assistant in the dataset's current state is greater than the pre-configured threshold, then the AI assessor would choose to delegate the remaining data tasks to the AI assistant. Thus, if it is determined in step 316 that YES the pre-configured threshold in predicted AI-human agreement has been reached, then in step 318 the AI assessor delegates the remaining data tasks to the AI assistant. On the other hand, if it is determined in step 316 that NO the pre-configured threshold in predicted AI-human agreement has not been reached, then the AI assessor continues to observe, track and predict AI-human agreement until the pre-configured threshold in predicted AI-human agreement has been reached. As noted above, the accuracy is expected to improve over time, as the AI assistant sees more training data.

Figure 4:
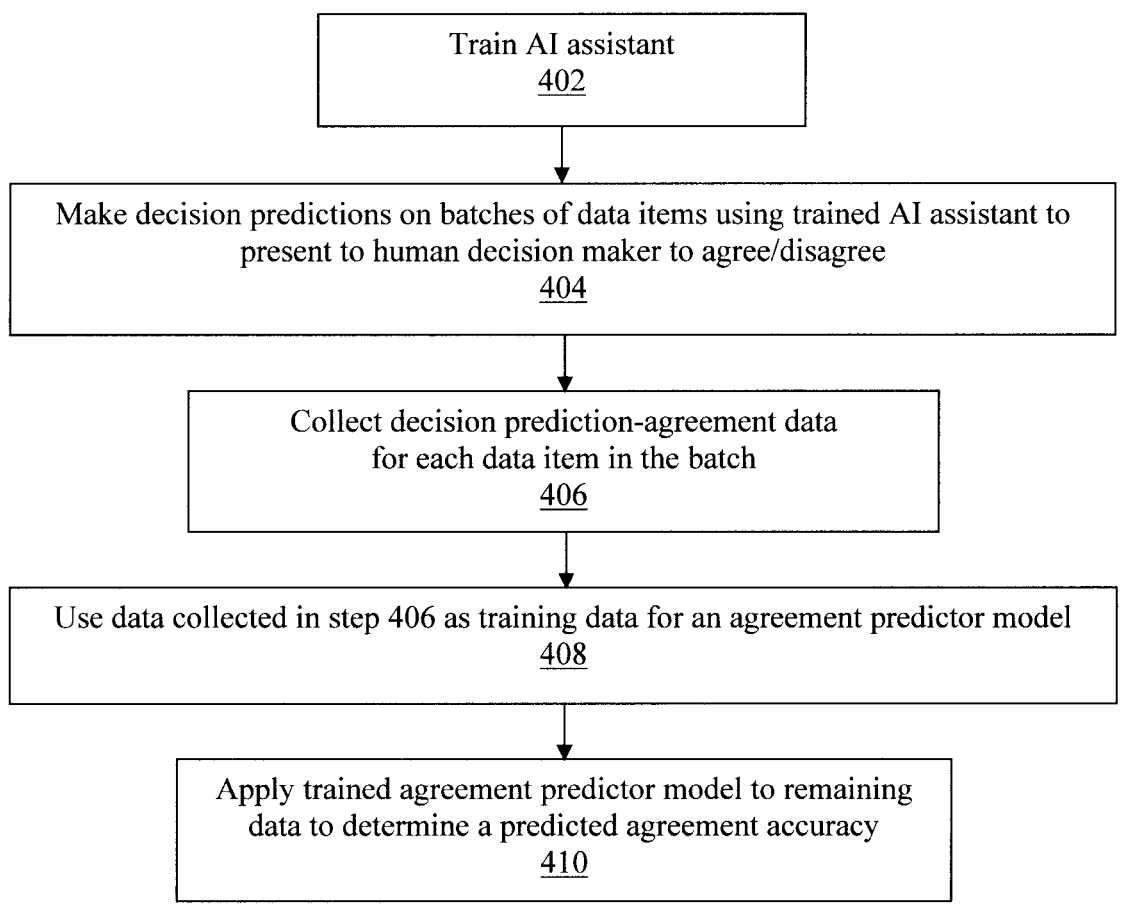
FIG. 4 is a diagram illustrating an exemplary methodology for performance prediction using an agreement predictor model according to an embodiment of the present invention.

An exemplary performance predictor model for use in accordance with the present techniques is now described in conjunction with the description of methodology 400 of FIG. 4. In the same manner as described in conjunction with the description of methodology 200 of FIG. 2 above, in step 402 the AI assistant is trained using (true) human decisions (e.g., labels) from the human decision maker via an iterative learning process, and in step 404 the trained AI assistant makes decision predictions (e.g., label predictions) for unseen (e.g., unlabeled) data.

Namely, in step 404, the AI assistant takes batches of (e.g., unlabeled) data items as input and outputs decision (e.g., label) predictions along with confidence values. As provided above, when making a decision prediction the AI assistant will determine a probability distribution vector across possible decisions. The confidence value defines the probability that data items fall into the different classes, such as 'cat' or 'dog' to use the above image labeling task as an example. For instance, some machine learning models, such as neural nets, determine a probability distribution across the possible decisions (or classes in general). The probabilities are usually interpreted as confidences. Thus, if the top-1 prediction of the model has 90% probability, then it can be said that the model is 90% confident that the top-1 prediction is accurate.

As described in conjunction with the description of step 206 of methodology 200 of FIG. 2 above, the data items together with the decision predictions and confidence values are then presented by the AI assistant to the human decision maker who either agrees or disagrees with the prediction. This data is collected over time. Thus, during each iteration of the active learning refinement loop, the following data is collected for each data item included in the batch:

[data item][AI assistant decision prediction][confidence value][agreed/not agreed], also referred to herein as 'decision prediction-agreement' data. See step 406. This data collected in step 406 is then used as training data for training an agreement predictor model. See step 408. The agreement predictor model can be trained using any suitable process. According to an exemplary embodiment, the agreement predictor model is trained using a random forest decision model. A random forest decision model is an ensemble learning method by which a large number of individual decision trees operate as an ensemble. Each decision tree provides a prediction, and the prediction having the highest outcome amongst the decision trees becomes the overall prediction of the model. Through this training the agreement predictor model learns under what circumstances (i.e., for which data item characteristics and which AI assistant prediction and confidence value characteristics) the AI assistant is likely to receive an agreement from the human decision maker. The term 'data item characteristics' refers to the features extracted from the data item.

During training, the agreement predictor model takes output from the AI assistant, i.e., [data item][AI assistant decision prediction][confidence value]. Based on the training data collected in step 406, the agreement predictor model outputs a predicted score, i.e., [agreed] or [not agreed].

Once trained, the agreement predictor model is applied in step 410 to the remaining unseen (e.g., unlabeled) data and their confidence values (from the AI assistant) to determine a predicted agreement accuracy for the remaining unseen (e.g., unlabeled) data. The predicted agreement accuracy is then used by the AI assessor in assessing the automation readiness of the AI assistant, and by the human decision maker or AI assessor in making a delegation decision as described, for example, in conjunction with the description of methodology 200 of FIG. 2 above.

The agreement predictor model is trained on the agreed/not agreed outcomes of the AI assistant predictions. Once trained, the agreement predictor, given as input a new example together with the AI assistant predictions and confidences, can predict whether the human decision maker is likely to agree or not agree with the AI assistant's prediction.

To use the agreement predictor model on the remaining (e.g., unlabeled) examples, all of those examples are first run through the AI assistant decision predictor—in order to have the examples together with the AI assistant predictions and confidences. The agreement predictor model is then applied to each example with its prediction and confidence value, and either agreed or not agreed is obtained as a prediction from the agreement predictor model. That way, a percentage (say 98%) of the items for which it is predicted that the human decision maker would agree with the AI assistant prediction can be determined.

So, alternatively, instead of showing these examples with their predictions to the human to 'measure' the agreement, the agreement predictor model can instead be used to 'predict' the agreement. This is also called a meta-prediction, i.e., predictions are made about how good (how agreeable) the AI assistant predictions are.

Figure 5:
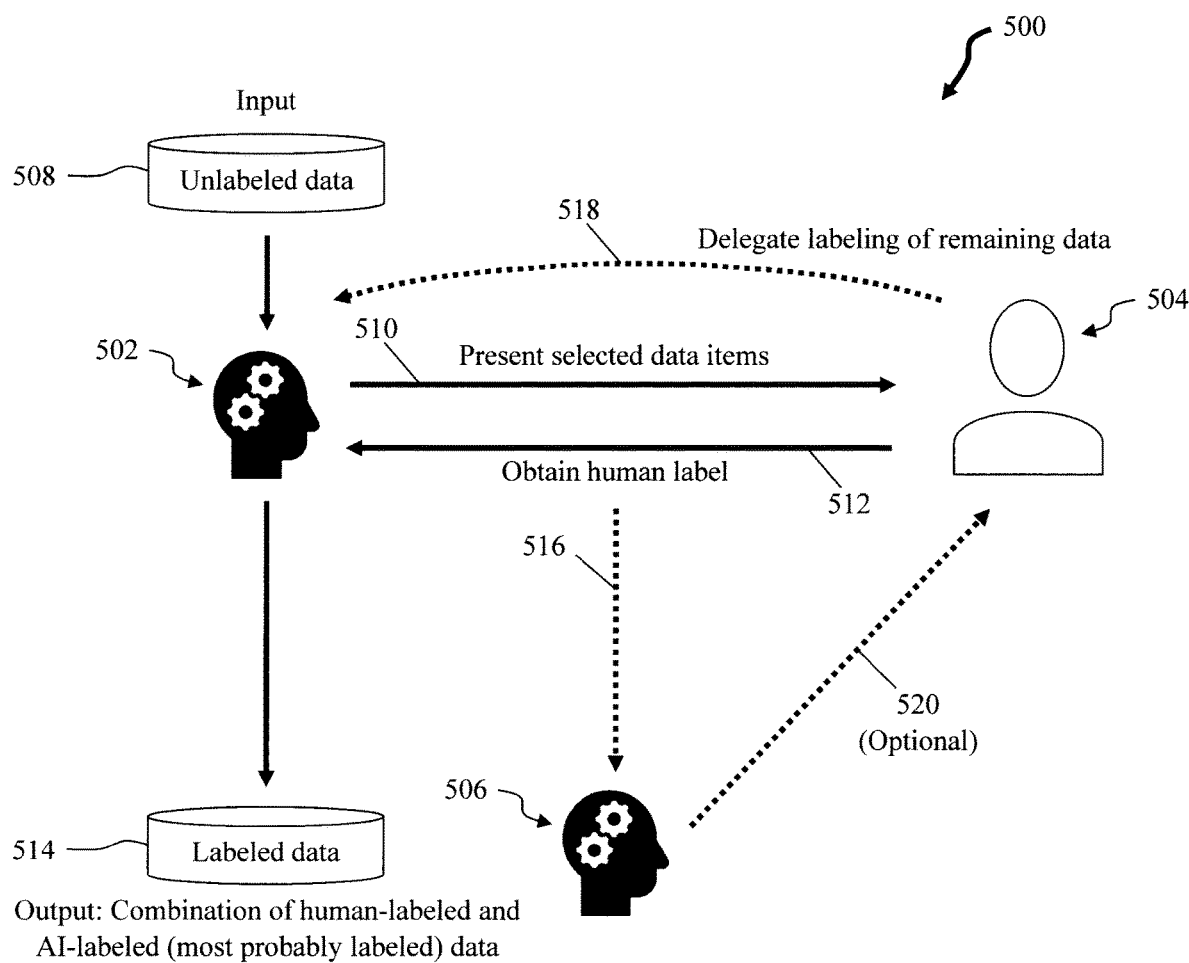
FIG. 5 is a diagram illustrating an exemplary system for hybrid decision making automation according to an embodiment of the present invention.

FIG. 5 is a diagram illustrating an exemplary system 500 for hybrid decision making automation in accordance with the present techniques. As shown in FIG. 5, system 500 is a three-party system including an AI assistant 502, a human decision maker 504, and an AI assessor 506. As provided above, the AI assistant 502 and the AI assessor 506 can be implemented in a computer-based apparatus such as apparatus 800 described in conjunction with the description of FIG. 8, below.

In the same manner as described in conjunction with the description of methodology 200 of FIG. 2 above, the AI assistant 502 takes input data such as unlabeled data from a database 508 (or other suitable repository) and provides a set of decision predictions, such as providing label predictions for a set of data labeling tasks. These decision predictions are made based on decisions the AI assistant 502 has already received from the human decision maker 504 as part of an active learning refinement loop. Namely, as shown in FIG. 5, the AI assistant 502 selects a batch of the (e.g., unlabeled) data and presents it to the human decision maker 504. See arrow 510. As provided above, a selection strategy such as low margin active learning can be used to select the (e.g., unlabeled) data to present to the human decision maker 504. In turn, the human decision maker 504 returns (true) human decisions (e.g., human labels) for the presented data. See arrow 512.

These (true) human decisions are then used by the AI assistant 502 in making further decision predictions, and so on in an active learning refinement loop. As described above, the decision predictions from the trained AI assistant 502 are presented to the human decision maker along with the corresponding data item and a confidence value, and the human decision maker either agrees or disagrees (agreed/not agreed) with the predictions made by the AI assistant. As shown in FIG. 5, the output from system 500 is a combination of human and AI assistant decision data (e.g., human-labeled and AI-labeled data). This output data is stored in a database 514 (or other suitable repository). According to an exemplary embodiment, the AI labeled data is obtained (after delegation) by assigning the top-1 prediction as the label, i.e., the data labeled using the top-1 (most probable) predicted label.

The AI assessor 506 observes the interactions between the AI assistant 502 and the human decision maker 504. See arrow 516. Namely, as described above, the AI assessor 506 tracks the AI assistant 502-to-human decision maker 504 decision agreement (agreed/not agreed) over time in order to assess and characterize the quality of the AI predictions. Based on the tracked agreement data, the AI assessor 506 predicts the AI assistant-to-human agreement for the remaining (unseen) input data using, e.g., the performance predictor described in conjunction with the description of methodology 400 of FIG. 4 above. Doing so permits an assessment to be made as to whether future predictions by the AI assistant 502 will be made with a sufficient level of accuracy and therefore support a decision to delegate labeling of the remaining data to the AI assistant 502 (see arrow 518), or whether the AI assistant 502 still needs further training.

As described in detail above, the delegation decision can be made by the human decision maker 504 or by the AI assessor 506 (in silent mode). With the former, the AI assessor 506 provides its assessment to the human decision maker 504. See arrow 520. The human decision maker 504 will then make a delegation decision based on the assessment provided by the AI assessor 506. However, this communication between the AI assessor 506 and the human decision maker 504 is optional. Namely, in the latter case, the AI assessor 506 itself makes the decision as to whether to delegate the remaining data tasks to the AI assistant 502 based, for example, on a pre-configured threshold in predicted AI-human agreement. In that case, the human decision maker 504 is likely unaware of the functions the AI assessor 506 performs in this decision making process. Namely, the AI assessor 506 operates in silent mode in the background.

As provided above, one type of decision making task is a data (e.g., image) labeling task. Thus, for illustrative purposes only, an exemplary methodology for hybrid data labeling automation is now described by way of reference to FIG. 6 and FIG. 7. In the context of this data labeling example, the AI assistant is also referred to as a 'AI label predictor' and the human decision maker is also referred to as the 'human labeler.' Thus, the terms 'AI assistant' and 'human decision maker' are used herein synonymously with 'AI label predictor' and 'human labeler,' respectively.

Figure 6:
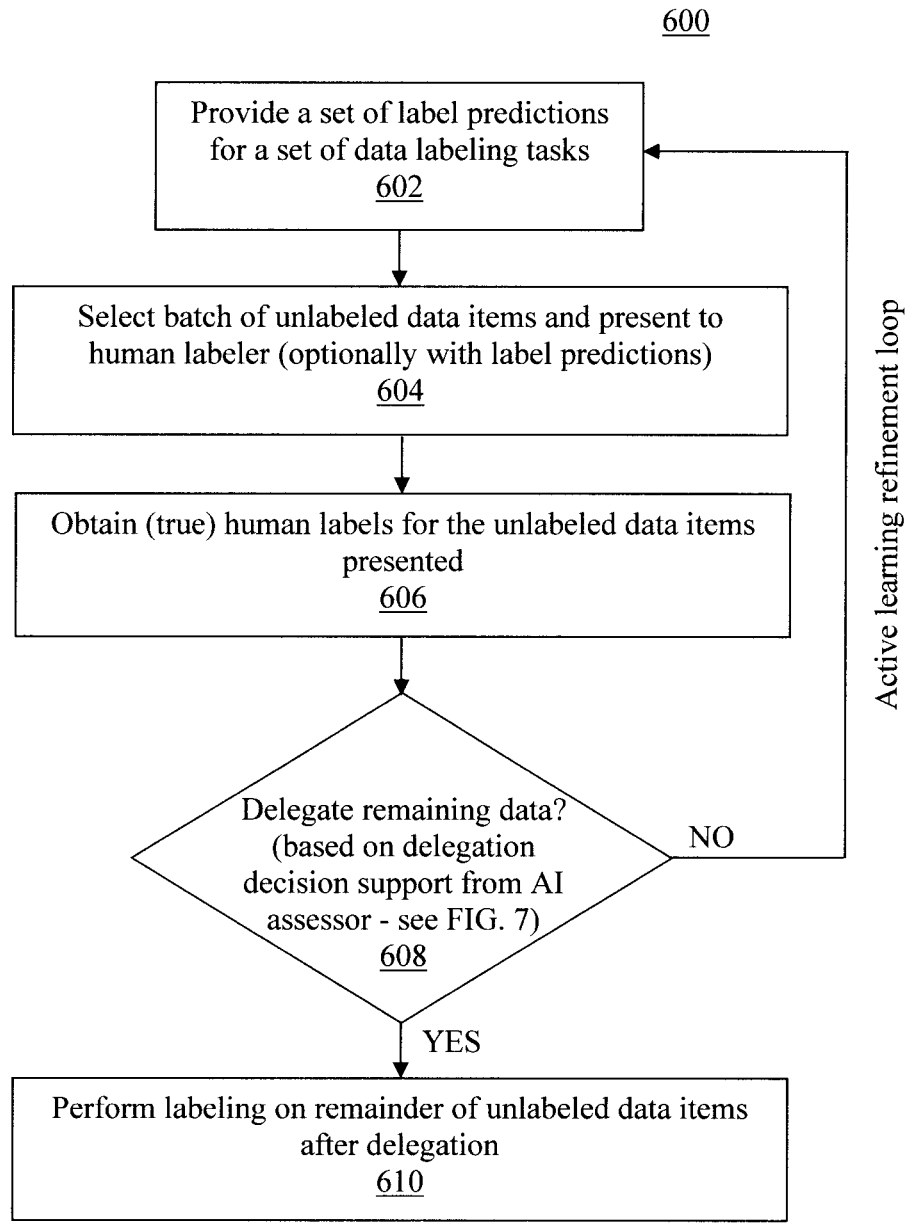
FIG. 6 is a diagram illustrating an exemplary methodology for hybrid data labeling automation as performed by an AI label predictor when coordinating with a human labeler and an AI assessor according to an embodiment of the present invention.

FIG. 6 provides an exemplary methodology 600 for hybrid data labeling automation one or more steps of which can be performed by the AI label predictor when coordinating with the human labeler and the AI assessor. In step 602, the AI label predictor takes unlabeled input data and provides a set of label predictions for a set of data labeling tasks.

The label predictions are made based on labels the AI label predictor has already received from the human labeler such that the AI label predictor and the human labeler execute an active learning refinement loop. Namely, in step 604, the AI label predictor selects a batch of unlabeled data items and presents the selected unlabeled data items to the human labeler. According to an exemplary embodiment, the AI label predictor uses a selection strategy such as low margin active learning (see above) to select the unlabeled data items to present to the human labeler. Namely, the AI label predictor is given the task of selecting the unlabeled data items to incorporate in the active learning refinement loop. As provided above, the AI label predictor can optionally provide its label predictions along with the data presented to the human labeler to assist the human labeler in picking the correct label.

Thus, the goal is to obtain (true) human labels for the data from the human labeler (see step 606, described below). In that regard, it may be beneficial to assist the human labeler with this process in order to enhance efficiency. Therefore, optionally, in step 604 label predictions made by the AI label predictor are also provided along with the data presented to the human labeler. Doing so will assist the human labeler in making the correct decision.

Presenting label predictions made by the AI label predictor to the human labeler in step 604 (along with the corresponding data item and a confidence value—see above) permits the human labeler to review the performance of the AI label predictor by either agreeing or disagreeing (agreed/not agreed) with the predictions made by the AI label predictor (i.e., AI-to-human agreement). As will be described in conjunction with the description of FIG. 7 below, the AI assessor tracks this AI-to-human agreement over time. The agreement tracking by the AI assessor happens in the background during the active learning refinement loop. Thus, when human labels are obtained in step 606 (described below), in the background, agreement between the human label and prediction is measured and recorded by the AI assessor.

The label predictions are the work of the AI label predictor and the AI assessor needs to have access to them. Thus, the label predictions always need to be shared with/visible to the AI assessor, such that the AI assessor can track agreement between the human label and label prediction in the background. However, as provided above, it is optional whether the label predictions are also shown to the human labeler.

In step 606, (true) human labels for the unlabeled data items presented to the human labeler are obtained from the human labeler. These human labels for the data items are then used by the AI label predictor in making further label predictions, and so on. Namely, as shown in FIG. 6, the process is repeated iteratively, i.e., in an active learning refinement loop. In step 606, the human labeler will provide human labels for each of the data items that have been presented to the human labeler. For those data items presented to the human labeler along with decision predictions made by the AI label predictor (see above), the human labeler will either agree or disagree with the decision prediction from the AI label predictor and, in the latter, change the label. As provided above, any type of semi-supervised learning, self-training/auto-labeling and/or weak supervision process can be employed to train the AI label predictor using the (true) human labels. For example, the tasks with human labels obtained so far can be used as training data to train a supervised machine learning model to make predictions for the remaining tasks (self-training/auto-labeling). According to an exemplary embodiment, a semi-supervised learning process such as label spreading (see above) is employed.

In step 608, a decision is made as to whether to delegate performance of the data tasks on the remaining data to the AI label predictor. As will be described in conjunction with the description of FIG. 7 below, this delegation decision is supported by an analysis from the AI assessor which has been tracking AI-to-human agreement in the background and will predict performance of the AI label predictor in making future labeling decisions. This prediction serves as a metric for how well the performance will be once the label decision making has been delegated to the AI label predictor. In other words, the predicted performance is an assessment of the readiness of the AI label predictor for automated operation (i.e., the automation readiness) such as auto-labeling.

Namely, once a level of confidence has been met in the label decisions being made by the (trained) AI label predictor, the label decision making capabilities can be fully delegated to the AI label predictor. As above, the decision to delegate the remaining data labeling tasks can reside wholly with the human labeler or, alternatively, the decision to delegate the remaining data labeling tasks to the AI label predictor can be made by the AI assessor (i.e., when the AI assessor operates in a silent mode). When the delegation decision will be made by the human labeler, the AI assessor can provide a recommendation to the human labeler when automation readiness has been achieved. Alternatively, in silent mode, the AI assessor itself can determine when automation readiness has been achieved based, for example, on a pre-configured threshold in predicted AI-human agreement. In either case, however, the delegation decision is supported by the AI assessor which tracks the interactions between the AI label predictor and the human labeler and, from those interactions, assesses the automation readiness.

Based on the presented analysis from the AI assessor (which is provided at the end of each active learning loop iteration), if it is decided in step 608 that NO automation readiness has not yet been achieved, then delegation to the AI label predictor is declined and training is continued with manual decision in the next iteration of the active learning refinement loop. On the other hand, if it is decided in step 608 that YES automation readiness has been achieved, then the label decision making capabilities are fully delegated to the AI label predictor and in step 610 the AI label predictor performs the label decision making on the remainder of the data tasks without receiving verification (agreed/not agreed) from the human labeler.

Figure 7:
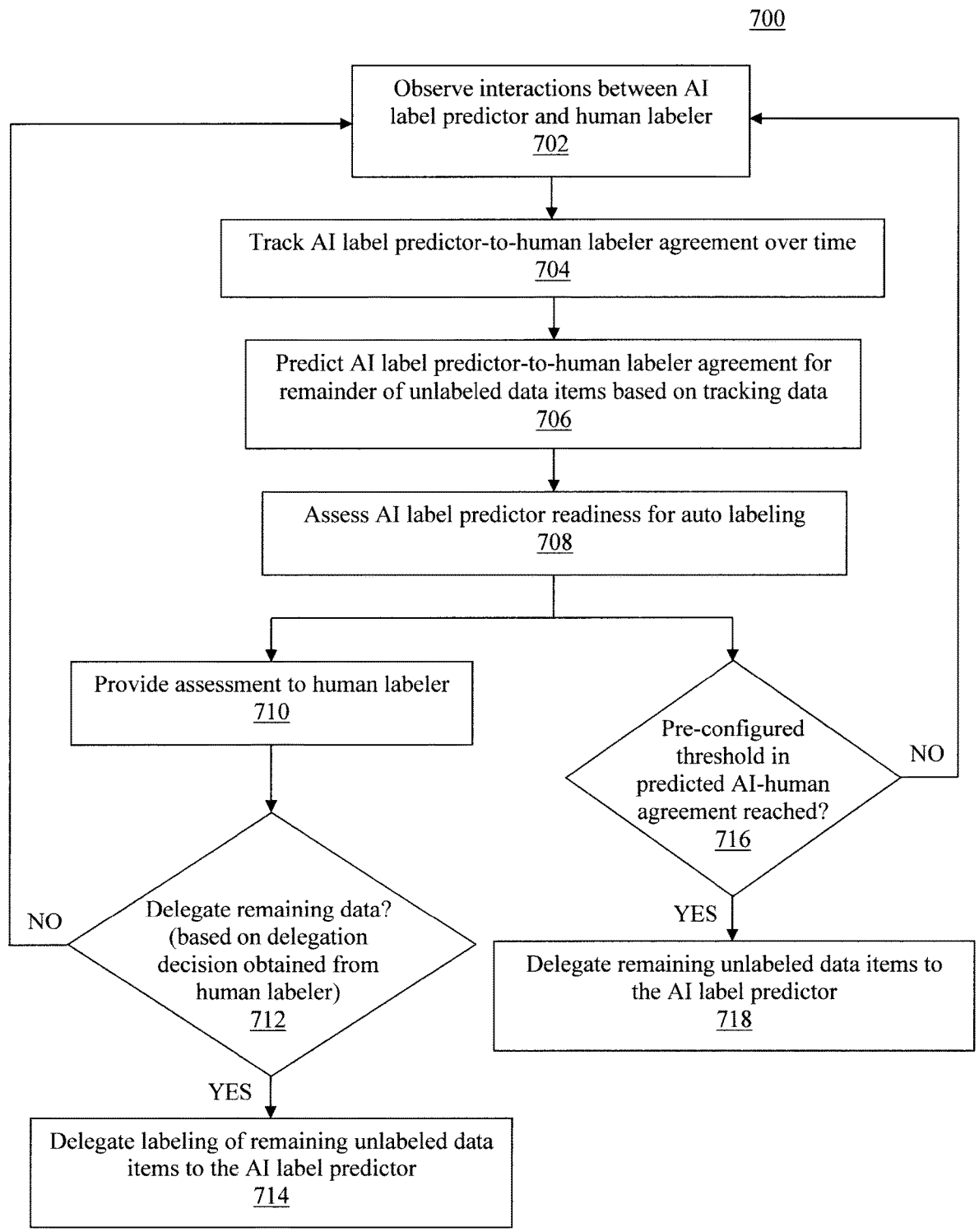
FIG. 7 is a diagram illustrating an exemplary methodology for hybrid data labeling automation as performed by the AI assessor when observing interactions between the human labeler and the AI label predictor according to an embodiment of the present invention.

FIG. 7 provides an exemplary methodology 700 for hybrid data labeling automation one or more steps of which can be performed by the AI assessor when observing the interactions between the human labeler and the AI label predictor. In step 702, the AI assessor observes the interactions between the human labeler and the AI label predictor. As provided above, the AI label predictor makes label predictions on unlabeled input data based on labels the AI label predictor has already received from the human labeler such that the AI label predictor and the human labeler execute an active learning refinement loop. The AI assessor monitors these AI label predictor-human labeler interactions in step 702.

In step 704, the AI assessor tracks the AI-to-human agreement over time. Namely, by observing the AI label predictor-human labeler interactions (see step 702), the AI assessor can determine how often the (true) human labels from the human decision labeler confirms (or does not confirm) the label predictions from the AI label predictor. Tracking the AI-to-human agreement over time enables the AI assessor to assess and characterize the quality of the AI label predictions.

In step 706, based on the tracked agreement data, the AI assessor predicts the AI label predictor-to-human agreement for the remaining unlabeled input data. Doing so permits an assessment to be made as to whether future label predictions by the AI label predictor will be made with a sufficient level of accuracy, or whether the AI label predictor needs further training. That assessment will then support making the delegation decision. According to an exemplary embodiment, the predicted AI label predictor-to-human agreement for the remaining unlabeled input data is made using a performance predictor (such as the performance predictor described in conjunction with the description of FIG. 4 above) that uses the tracked agreement data to train an agreement predictor model. Through this training, the agreement predictor will learn under what circumstances (i.e., for which data item characteristics and which label predictions and confidence value characteristics) the AI label predictor is likely to receive an agreement from the human labeler.

Based on the tracking (step 704) and predicted performance (step 706), in step 708 the AI assessor makes an assessment of the readiness of the AI label predictor for automated operation (automation readiness) such as auto-labeling. For instance, by way of example only, the assessment made in step 708 can be based on AI-to-human agreement, namely what percentage of the time the human labeler agreed with the label predictions of the AI label predictor. As highlighted above, the AI label predictor will provide a confidence value along with its label prediction on each of the data items. Thus, another potential metric is certainty, for example, how certain the AI label predictor is about the accuracy of the label predictions it has made over time. Using the performance predictor, the AI label predictor can also determine how accurate it thinks it will be should the AI label predictor begin automated operation in the dataset's current state.

When the delegation decision is made by the human labeler, in step 710 the AI assessor provides its assessment (from step 708) to the human labeler. The human labeler will then make a delegation decision based on the assessment provided by the AI assessor. Namely, in step 712, a decision is then made by the human labeler as to whether to delegate performance of the remaining data items to the AI label predictor. This delegation decision is obtained by the AI assessor. If it is decided in step 712 that NO performance of the remaining data items should not be delegated to the AI label predictor, then the AI assessor continues to observe, track and predict AI-to-human agreement until a decision is obtained from the human labeler to delegate performance of the remaining data items to the AI label predictor. On the other hand, if it is decided in step 712 that YES performance of the remaining data items should be delegated to the AI label predictor, then in step 714 the AI assessor (upon obtaining this decision) delegates the remaining data tasks to the AI label predictor.

Alternatively, when the delegation decision is made by the AI assessor, in step 716 the AI assessor determines whether a pre-configured threshold in predicted AI-human agreement has been reached. If it is determined in step 716 that YES the pre-configured threshold in predicted AI-human agreement has been reached, then in step 718 the AI assessor delegates the remaining data tasks to the AI label predictor. On the other hand, if it is determined in step 716 that NO the pre-configured threshold in predicted AI-human agreement has not been reached, then the AI assessor continues to observe, track and predict AI-to-human agreement until the pre-configured threshold in predicted AI-human agreement has been reached. As noted above, the accuracy is expected to improve over time, as the AI label predictor sees more training data.

As will be described below, one or more elements of the present techniques can optionally be provided as a service in a cloud environment. For instance, by way of example only, the input and/or output data items can reside remotely on a cloud server. Also, the one or more functions of the AI assessor and/or AI assistant/AI label predictor can be performed on a dedicated cloud server to take advantage of high-powered CPUs and GPUs, after which the result is sent back to the local device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
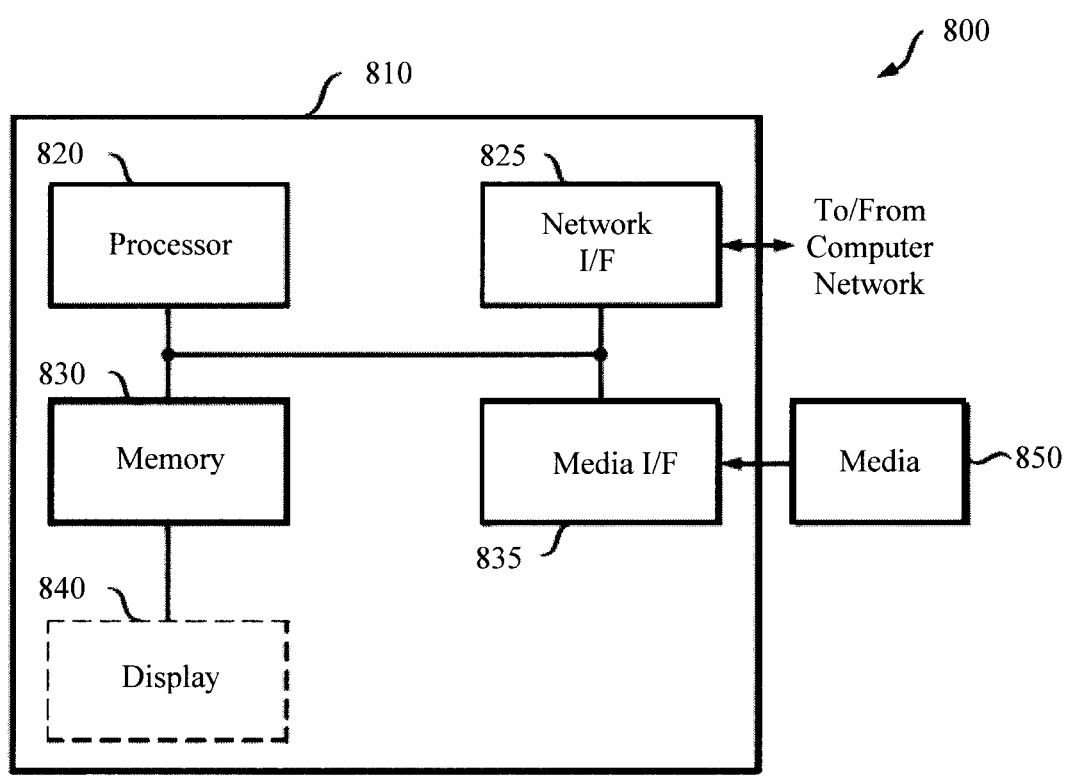
FIG. 8 is a diagram illustrating an exemplary apparatus for performing one or more of the methodologies presented herein according to an embodiment of the present invention.

Turning now to FIG. 8, a block diagram is shown of an apparatus 800 for implementing one or more of the methodologies presented herein. By way of example only, apparatus 800 can be configured to implement one or more of the steps of methodology 200 of FIG. 2, one or more of the steps of methodology 300 of FIG. 3, one or more of the steps of methodology 400 of FIG. 4, one or more of the steps of methodology 600 of FIG. 6 and/or one or more of the steps of methodology 700 of FIG. 7. For instance, according to an exemplary embodiment, the AI assistant/AI label predictor and/or the AI assessor are implemented in apparatus 800.

Apparatus 800 includes a computer system 810 and removable media 850. Computer system 810 includes a processor device 820, a network interface 825, a memory 830, a media interface 835 and an optional display 840. Network interface 825 allows computer system 810 to connect to a network, while media interface 835 allows computer system 810 to interact with media, such as a hard drive or removable media 850.

Processor device 820 can be configured to implement the methods, steps, and functions disclosed herein. The memory 830 could be distributed or local and the processor device 820 could be distributed or singular. The memory 830 could be implemented as an electrical, magnetic or optical memory, or any combination of these or other types of storage devices. Moreover, the term "memory" should be construed broadly enough to encompass any information able to be read from, or written to, an address in the addressable space accessed by processor device 820. With this definition, information on a network, accessible through network interface 825, is still within memory 830 because the processor device 820 can retrieve the information from the network. It should be noted that each distributed processor that makes up processor device 820 generally contains its own addressable memory space. It should also be noted that some or all of computer system 810 can be incorporated into an application-specific or general-use integrated circuit.

Optional display 840 is any type of display suitable for interacting with a human user of apparatus 800. Generally, display 840 is a computer monitor or other similar display.

Figure 9:
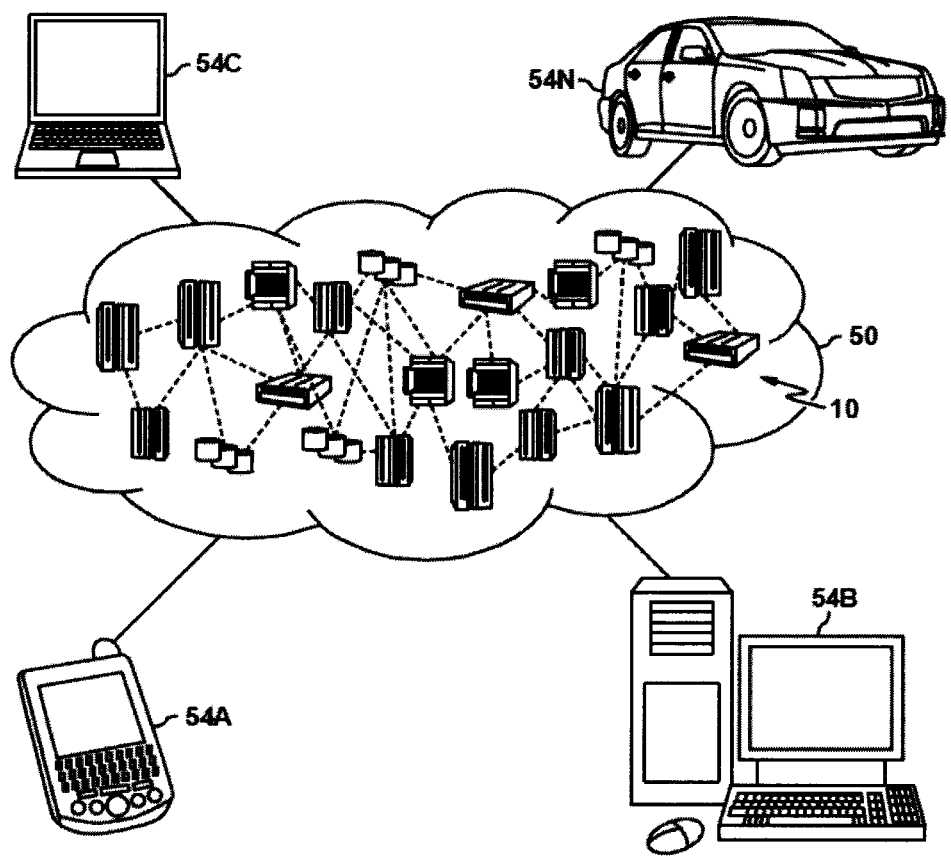
FIG. 9 depicts a cloud computing environment according to an embodiment of the present invention.
Figure 10:
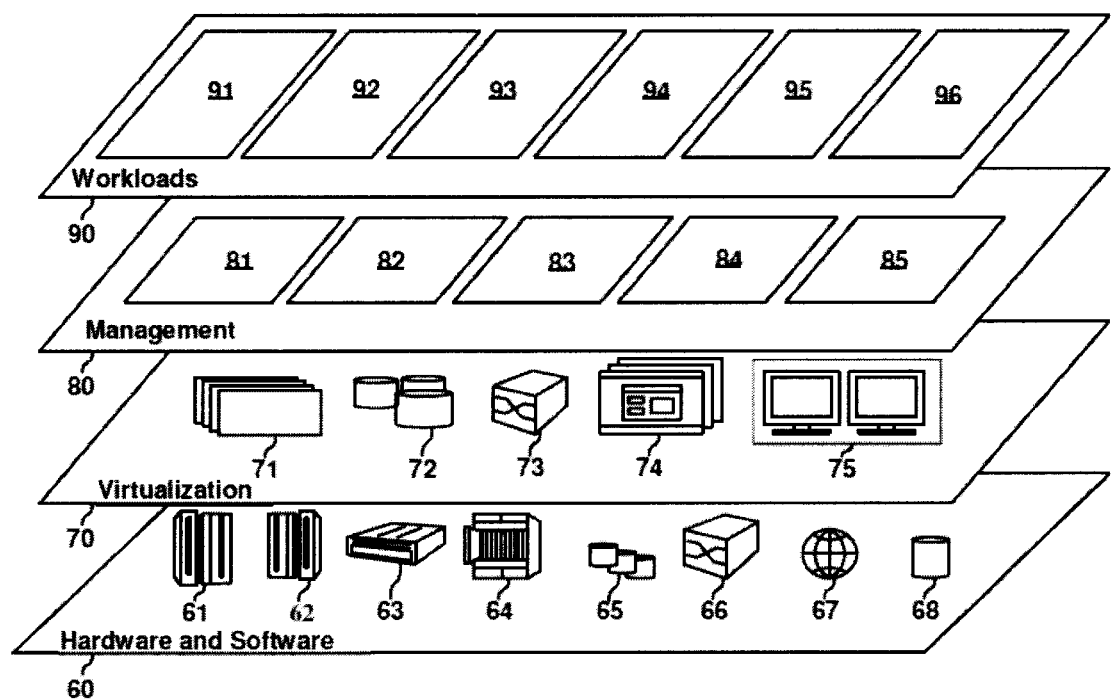
FIG. 10 depicts abstraction model layers according to an embodiment of the present invention.

Referring to FIG. 9 and FIG. 10, it is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and hybrid decision making automation 96.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A method for hybrid decision making automation, the method comprising:
   training an artificial-intelligence (AI) assistant based on decisions the AI assistant has already received from a human decision maker;
   calculating decision predictions on data tasks using the AI assistant;
   identifying agreement by the human decision maker with the decision predictions made by the AI assistant based on interactions between the AI assistant and the human decision maker;
   selecting a batch of unseen input data by the AI assistant;
   training an agreement predictor model, based on the agreement over time using tracked agreement data, to generate a predicted performance of data tasks by the AI assistant on the unseen data; and
   performing a delegation of the remaining data tasks on the unseen data to the AI assistant.

2. The method of claim 1, further comprising:
   presenting a delegation assessment to the human decision maker.

3. The method of claim 2, further comprising:
   obtaining a delegation decision from the human decision maker; and
   delegating performance of the remaining data tasks on the unseen data to the AI assistant.

4. The method of claim 1, wherein the data tasks comprise data labeling tasks.

5. The method of claim 4, further comprising:
   tracking, from the interactions, agreement of the human decision maker with label predictions made by the AI assistant;
   determining a predicted performance of the data labeling tasks by the AI assistant on the unlabeled data based on the agreement of the human decision maker with the label predictions over time; and
   assessing delegation of remaining data labeling tasks on the unseen data to the AI assistant using the predicted performance.

6. The method of claim 1, wherein the predicted performance of the data tasks is determined using an agreement predictor model.

7. The method of claim 6, further comprising:
   training the agreement predictor model using the agreement of the human decision maker with the decision predictions over time; and
   applying the agreement predictor model to remaining unseen data to determine a predicted agreement accuracy of the AI assistant for the remaining unseen data.

8. The method of claim 7, further comprising:
   assessing an automation readiness of the AI assistant using the predicted agreement accuracy.

9. A method for hybrid decision making automation, the method comprising:
   training an artificial-intelligence (AI) assistant based on decisions the AI assistant has already received from a human decision maker;
   calculating decision predictions on data tasks using the AI assistant;
   identifying agreement by the human decision maker with the decision predictions made by the AI assistant based on interactions between the AI assistant and the human decision maker;
   selecting a batch of unseen input data by the AI assistant;
   training an agreement predictor model, based on the agreement over time using tracked agreement data, to generate a predicted performance of data tasks by the AI assistant on the unseen data;
   determining whether a pre-configured threshold in predicted AI-human agreement has been reached; and
   in response to the pre-configured threshold being reached, performing a delegation of the remaining data tasks on the unseen data to the AI assistant.

10. The method of claim 9, wherein the tasks comprise data labeling tasks, and wherein the method further comprises:
tracking, from the interactions, agreement of the human decision maker with label predictions made by the AI assistant;
determining a predicted performance of the data labeling tasks by the AI assistant on unlabeled data based on the agreement of the human decision maker with the label predictions over time; and
assessing delegation of remaining data labeling tasks on the unseen data to the AI assistant using the predicted performance.

11. The method of claim 9, wherein the predicted performance of the data tasks is determined using an agreement predictor model, and wherein the method further comprises:
training the agreement predictor model using the agreement of the human decision maker with the decision predictions over time; and
applying the agreement predictor model to remaining unseen data to determine a predicted agreement accuracy of the AI assistant for the remaining unseen data.

12. The method of claim 11, further comprising:
assessing an automation readiness of the AI assistant using the predicted agreement accuracy.

13. A system for hybrid decision making automation, the system comprising a processor device, connected to a memory, operable to:
train an artificial-intelligence (AI) assistant based on decisions the AI assistant has already received from a human decision maker;
calculate decision predictions on data tasks using the AI assistant based on decisions the AI assistant has already received from a human decision maker
identify agreement by the human decision maker with the decision predictions made by the AI assistant based on interactions between the AI assistant and the human decision maker;
select a batch of unseen input data by the AI assistant;
train an agreement predictor model, based on the agreement over time using tracked agreement data, to generate a predicted performance of data tasks by the AI assistant on the unseen data; and
perform a delegation of the remaining data tasks on the unseen data to the AI assistant.

14. The system of claim 13, wherein the processor device is further operable to:
present a delegation assessment to the human decision maker.

15. The system of claim 14, wherein the processor device is further operable to:
obtain a delegation decision from the human decision maker; and
delegate performance of the remaining data tasks on the unseen data to the AI assistant.

16. The system of claim 13, wherein the predicted performance of the data tasks is determined using an agreement predictor model, and wherein the processor device is further operable to:
train the agreement predictor model using the agreement of the human decision maker with the decision predictions over time;
apply the agreement predictor model to remaining unseen data to determine a predicted agreement accuracy of the AI assistant for the remaining unseen data; and
assess an automation readiness of the AI assistant using the predicted agreement accuracy.

17. The system of claim 13, wherein the processor device is further operable to:
determine whether a pre-configured threshold in predicted AI-human agreement has been reached; and
delegate performance of the remaining data tasks on the unseen data to the AI assistant when the pre-configured threshold in predicted AI-human agreement has been reached.

18. A non-transitory computer program product for hybrid decision making automation, the computer program product comprising a computer readable storage medium having program instructions embodied therewith, the program instructions executable by a computer to cause the computer to:
train an artificial-intelligence (AI) assistant based on decisions the AI assistant has already received from a human decision maker;
calculate decision predictions on data tasks using the AI assistant;
identify agreement by the human decision maker with the decision predictions made by the AI assistant based on interactions between the AI assistant and the human decision maker;
select a batch of unseen input data by the AI assistant;
train an agreement predictor model, based on the agreement over time using tracked agreement data, to generate a predicted performance of data tasks by the AI assistant on the unseen data; and
perform a delegation of the remaining data tasks on the unseen data to the AI assistant.

19. The non-transitory computer program product of claim 18, wherein the program instructions further cause the computer to:
present a delegation assessment to the human decision maker;
obtain a delegation decision from the human decision maker; and
delegate performance of the remaining data tasks on the unseen data to the AI assistant.

20. The non-transitory computer program product of claim 18, wherein the predicted performance of the data tasks is determined using an agreement predictor model, and wherein the program instructions further cause the computer to:
train the agreement predictor model using the agreement of the human decision maker with the decision predictions over time;
apply the agreement predictor model to remaining unseen data to determine a predicted agreement accuracy of the AI assistant for the remaining unseen data; and
assess an automation readiness of the AI assistant using the predicted agreement accuracy.

21. The non-transitory computer program product of claim 18, wherein the program instructions further cause the computer to:
determine whether a pre-configured threshold in predicted AI-human agreement has been reached; and
delegate performance of the remaining data tasks on the unseen data to the AI assistant when the pre-configured threshold in predicted AI-human agreement has been reached.

22. A method for hybrid decision making automation, the method comprising:
training an artificial-intelligence (AI) assistant based on decisions the AI assistant has already received from a human decision maker;

making decision predictions on data tasks using the AI assistant;

presenting the decision predictions to the human decision maker for the human decision maker to agree or disagree with the decision predictions, wherein an AI assessor, which monitors interactions between the AI assistant and the human decision maker, tracks agreement of the human decision maker with the decision predictions made by the AI assistant from the interactions, selects a batch of unseen input data by the AI assistant, trains an agreement predictor model to generate a predicted performance of the data tasks by the AI assistant on the unseen data based on the agreement of the human decision maker with the decision predictions over time, and assesses delegation of remaining data tasks on the unseen data to the AI assistant using the predicted performance; and performing the remaining data tasks on the unseen data when performance has been delegated to the AI assistant.

23. The method of claim 22, wherein the decision predictions are presented to the human decision maker along with a corresponding data item and a confidence value.

24. The method of claim 22, wherein the data tasks comprise data labeling tasks.

25. The method of claim 24, further comprising:

making label predictions on the data labeling tasks based on labels the AI assistant has already received from the human decision maker;

presenting the label predictions to the human decision maker for the human decision maker to agree or disagree with the label predictions, wherein an AI assessor, which monitors interactions between the AI assistant and the human decision maker, tracks agreement of the human decision maker with the label predictions made by the AI assistant from the interactions, selects a batch of unseen input data, determines a predicted performance of the data labeling tasks by the AI assistant on the unseen data based on the agreement of the human decision maker with the label predictions over time, and assesses delegation of remaining data labeling tasks on the unseen data to the AI assistant using the predicted performance; and performing the remaining data labeling tasks on the unseen data when performance has been delegated to the AI assistant.

* * * * *